Jan. 15, 1946.    D. D. AUSTIN    2,392,803
GEAR FINISHING
Filed Sept. 10, 1943    2 Sheets-Sheet 1

*INVENTOR.*
DONALD D. AUSTIN
BY
ATTORNEYS

Jan. 15, 1946. D. D. AUSTIN 2,392,803
GEAR FINISHING
Filed Sept. 10, 1943 2 Sheets-Sheet 2

*INVENTOR.*
DONALD D. AUSTIN
BY
ATTORNEYS

Patented Jan. 15, 1946

2,392,803

UNITED STATES PATENT OFFICE 2,392,803

GEAR FINISHING

Donald D. Austin, Detroit, Mich., assignor to National Broach & Machine Company, Detroit, Mich., a corporation of Michigan Application September 10, 1943, Serial No. 501,865

4 Claims. (Cl. 90—1.6)

The invention relates to the finishing of gears and refers more particularly to the finishing of the teeth of roughed-out gears by shaving.

Heretofore the teeth of roughed-out gears have been shaved to provide accurate active profiles on the flanks of the teeth, but gears finished in this manner have been open to objection especially for use in certain types of work, such as airplane engines, because the roots of the gears at the bottoms of the spaces between their teeth have marks resulting from the roughing-out tool, such as a hob. These marks form stress concentration points at which failure of the gears may occur.

The invention has for one of its objects to provide an improved method of finishing the teeth of a gear by shaving both the roots of the teeth and the flanks of the teeth to form smooth finished surfaces free of roughing-out marks.

The invention has for another object to provide an improved method of shaving the teeth of the gear by which the surfaces of the roots and flanks of the teeth merge or blend gradually or smoothly into each other.

The invention has for a further object to provide an improved cutter for use in carrying out the method.

These and other objects will become apparent from the following description when taken in conjunction with the accompanying drawings, in which Figure 1 is a diagrammatic view indicating the relationship of parts in practicing the method embodying the invention;

In carrying out the method embodying the invention, a circular gear-like cutter is rotated in mesh and at crossed axes with a roughed-out gear which has been formed by hobbing a gear blank. During the rotation cutting takes place over a limited contact area so that a minimum pressure is required and, as a result, a minimum distortion takes place. During the rotation a relative lateral movement or translation between the cutter and gear is effected to distribute the cutting action of the cutter from end to end of the teeth of the gear. At the ends of the relative lateral movement or translation the cutter and gear are relatively fed toward each other until the desired amount of material has been removed from the gear.

A machine for carrying out the above method is illustrated in the Drummond Patent No. 2,270,421, patented January 20, 1942.

Figure 1:
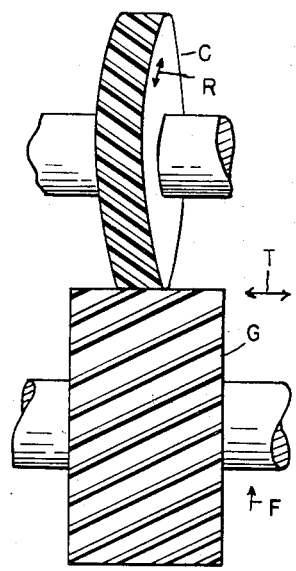
Figure 2:
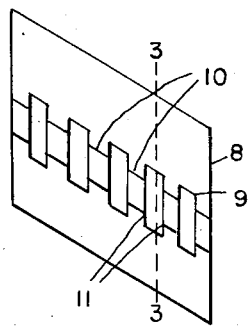
Figure 2 is a plan view of a tooth of a cutter employed in carrying out the method.
Figure 3:
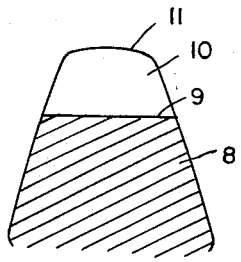
Figure 3 is a cross section on the line 3—3 of Figure 2.
Figure 4:
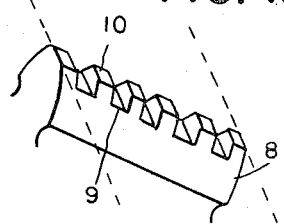
Figure 4 is a perspective view of a portion of the tooth of Figure 2.
Figure 5:
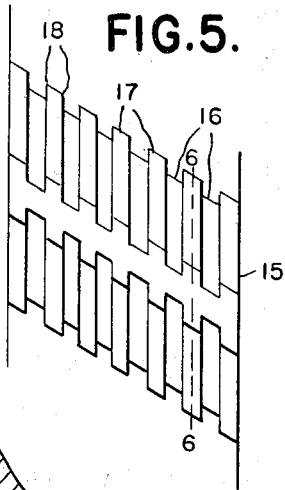
Figure 5 is a plan view of a tooth of a second cutter employed in carrying out the method.
Figure 6:
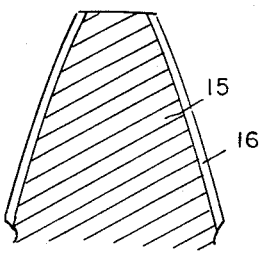
Figure 6 is a cross section on the line 6—6 of Figure 5.
Figure 7:
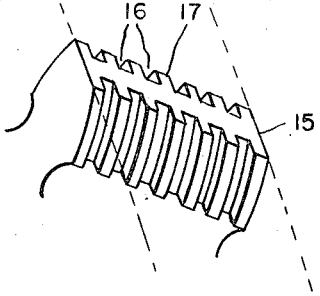
Figure 7 is a perspective view of a portion of the tooth of Figure 5.

As diagrammatically illustrated in Figure 1, C is the circular gear-like cutter having its teeth provided with cutting edges and G is the roughed out or hobbed gear. The cutter and gear are in mesh at crossed axes at a limited angle preferably between 3 and 30 degrees to provide a limited contact area therebetween. Also the cutter and gear are rotated while in mesh preferably by rotating the cutter, as indicated by the arrow R, and through the cutter rotating the gear to give the cutting edges of the cutter a component of lateral motion relative to the gear. During the rotation, the cutter and gear are also relatively laterally moved or translated, as indicated by the arrow T, in timed relation to the rotation to give the cutting edges of the cutter a second component of lateral motion relative to the gear in the same direction as the first mentioned component to thereby distribute the cutting action of the cutter longitudinally from end to end of the teeth of the gear. It is to be noted that the cutter and gear are preferably rotated in one direction during their relative translation in one direction and that their direction of rotation is reversed during their relative translation in the opposite direction. The relative translation is preferably carried out by reciprocating the gear in a direction parallel to its axis. Also the cutter and gear are relatively fed toward each other as by moving the gear in the direction indicated by the arrow F through small increments at the ends of the relative translation.

Referring to Figures 2 to 10, inclusive, the roots 1 of the teeth 2 of the roughed-out or hobbed gear 3 are first shaved and then the outer portions 4 of the flanks of the teeth are shaved, the outer portions when finished forming the active profiles for engaging the teeth of a meshing gear. The roots 1 comprise the extreme root portions 5 at the bottoms of the spaces between the teeth 2 and the root fillets 6 between the extreme root portions and the flanks of the teeth.

It is very desirable to remove as nearly as possible a uniform amount of material from the teeth of the roughed-out or hobbed gear. The cutter has a different generating action on the gear than the hob and, therefore, the tips of the teeth of the cutter are especially developed to shave the roots of the teeth to a contour corresponding to the theoretical contour which is supposed to be generated by the hob. As illustrated in Figures 2, 3, 4 and 8, the first shaving step is carried out employing the cutter 7 which is circular and gear-like. The cutter has each of its teeth 8 formed with the transverse grooves 9 in its tip providing the lands 10 having at their corners the cutting edges 11. The grooves and lands are parallel to the plane of rotation of the cutter. The portions 12 of the flanks of each tooth 8 located inwardly toward the axis of the cutter from the grooves serve during the operation of the cutter 7 on the gear 3 only to guide the cutter and gear teeth while in mesh and, as shown, the inner flank portions 12 have smooth continuous surfaces devoid of cutting edges. With the cutter 7 in mesh at crossed axes with the gear 3 and the transverse cutting edges 11 engaging the roots 1 during the rotation, relative translation and relative feeding of the cutter and gear toward each other, as illustrated in Figure 1, the roots are shaved to the desired extent and finished. Also at the same time the inner flank portions 13 of the gear teeth 2 at the bases of the teeth are undercut and finished by shaving the same with the cutting edges 11. The shaving as thus far described secures a smooth continuous surface in which the extreme root portions 5 and the root fillets 6 forming the roots 1 and the inner flank portions 13 merge or blend gradually or smoothly into each other and are free of marks.

As illustrated in Figures 5, 6, 7 and 9, the second shaving step is carried out employing the cutter 14 which is circular and gear-like and has its teeth conjugate to the teeth of the gear to be finished. The cutter has each of its teeth 15 formed with the grooves 16 in its flanks providing the lands 17 having at their corners the cutting edges 18. The grooves and lands extend from the tips to the bases of the teeth generally parallel to the plane of roll of the cutter. With the cutter 14 in mesh at crossed axes with the gear 3 after it has been shaved by the cutter 7 and with the cutting edges 18 engaging the outer portions 4 of the flanks of the gear teeth during the rotation, relative translation and relative feeding of the cutter and gear toward each other, as illustrated in Figure 1, the outer flank portions are shaved to the desired extent and finished free of marks.

The first and second shaving steps are carried out in correlation to each other such that the outer flank portions and the inner flank portions merge or blend gradually or smoothly into each other, it being apparent that the zone of merging or blending may be at the base circle of the gear or outwardly or inwardly thereof, depending upon the desired gear teeth contours. The gear resulting from the first and second shaving steps is illustrated by the full lines in Figure 10, the dotted lines representing the roughed-out or hobbed gear. From the figure it will be seen that a substantially uniform amount of material is removed from the roughed-out or hobbed gear.

Figure 11:
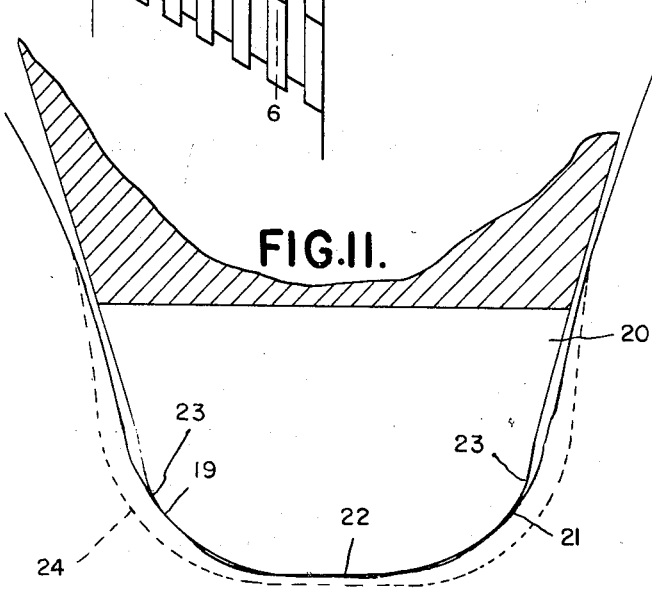
Figure 11 is a diagrammatic view illustrating a modified cutter for carrying out one of the shaving steps.
Figure 8:
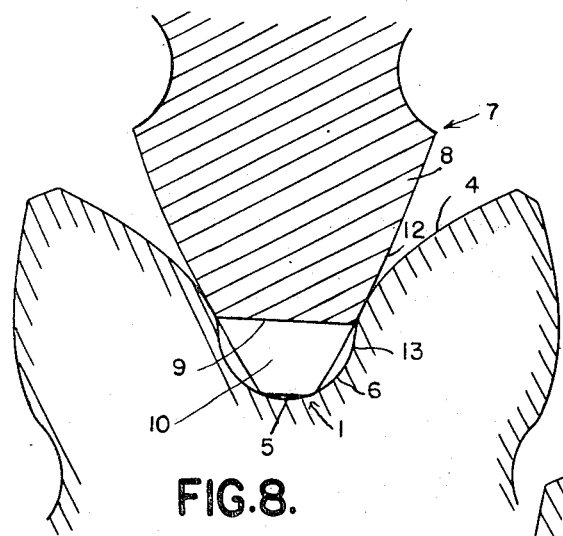
Figures 8 and 9 are diagrammatic views illustrating the steps of the method.
Figure 9:
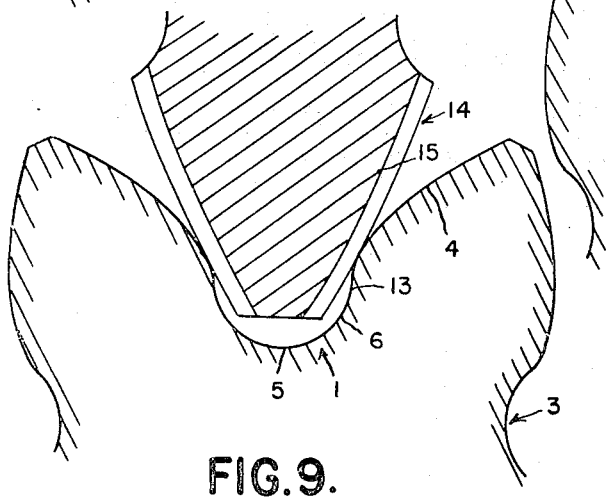

In the event that the roughed-out or hobbed gear has a different root contour, as shown at 19 in Figure 11, a different cross sectional contour of the tips of the teeth 20 of the first shaving cutter is provided. More in detail, the cutter has the curved corners 21 of the same radius, the flat intermediate portion 22 and the protuberances 23 merging into the corners and the cutter produces a shaved root contour shown by the dotted line 24. The second shaving step may then be carried out in the manner above described to complete the shaving of the gear. It will therefore be seen that a substantially uniform amount of material is removed by using a cutter especially developed for use with the roughed-out or hobbed gear.

Figure 12:
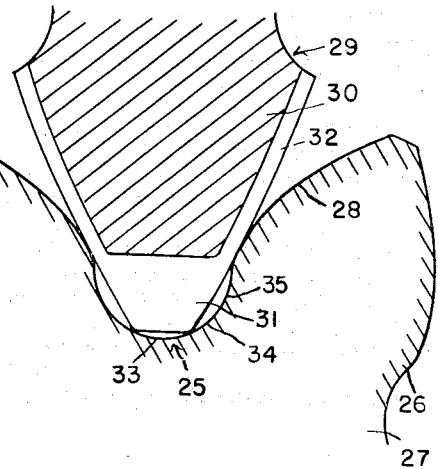
Figure 12 is a diagrammatic view illustrating a modified method.
Figure 10:
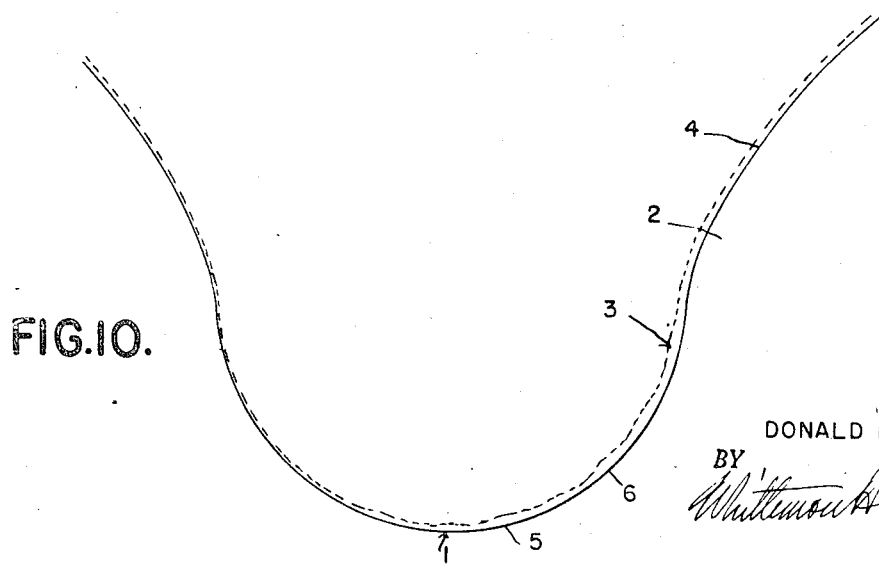
Figure 10 is a diagrammatic view illustrating the material removed by the steps of the method in finishing the teeth of the roughed-out gear.

As illustrated in Figure 12. the shaving of the roots 25 of the teeth 26 of the gear 27 and the shaving of the outer portions 28 of the flanks of the gear teeth are carried out at the same time by the cutter 29. This cutter has the tips and flanks of its teeth 30 formed with the grooves 31 and 32 corresponding respectively to the grooves 9 of the cutter 7 and the grooves 16 of the cutter 14. These grooves provide lands having cutting edges at their corners, the cutting edges at the tips shaving the extreme root portions 33, the root fillets 34 and the inner flank portions 35 and the cutting edges at the flanks shaving the outer flank portions 28. The shaved finished surfaces all merge or blend gradually or smoothly into each other to avoid any localized stress zone.

The gears finished by the above methods have involute teeth.

What I claim as my invention is:

1. The method of finishing the teeth of a roughed-out gear which includes meshing at crossed axes the gear and a toothed cutter having the tips of its teeth provided with transverse cutting edges, operating the gear and cutter while in mesh and with the cutting edges of the cutter engaging the extreme root portions of the teeth of the gear at the bottoms of the spaces between the teeth, and at the same time effecting a relative lateral movement between the cutting edges and the extreme root portions thereby finishing the extreme root portions, then meshing at crossed axes the gear and a toothed cutter having the flanks of its teeth provided with cutting edges, operating the gear and the second mentioned cutter while in mesh and with the second mentioned cutting edges engaging portions of the flanks of the teeth of the gear, and at the same time effecting a relative lateral movement between the second mentioned cutting edges and the portions of the flanks thereby finishing the same.

2. The method of finishing the teeth of a roughed-out gear which includes meshing at crossed axes the gear and a toothed cutter having the tips of its teeth provided with transverse cutting edges, rotating the gear while in mesh with the cutter with the cutting edges of the cutter engaging the roots and the inner portions of the flanks of the teeth of the gear, and at the same time effecting a relative lateral movement between the cutting edges and the roots and inner flank portions thereby finishing the roots and inner flank portions, then meshing at crossed axes the gear and a toothed cutter having the flanks of its teeth provided with cutting edges, rotating the gear while in mesh with the second mentioned cutter with the second mentioned cutting edges engaging the outer portions of the flanks of the teeth of the gear outwardly beyond the inner flank portions, and at the same time effecting a relative lateral movement between the second mentioned cutting edges and the outer flank portions thereby finishing the same and also blending the same smoothly into the inner flank portions.

3. The method of finishing the teeth of a roughed-out gear member which comprises the step of shaving the roots of the teeth of the gear member by meshing the gear member with a circular gear-like cutter member having transverse cutting edges provided on the tips of the teeth thereof and smooth continuous surfaces provided on the flanks of the teeth thereof and with the axes of the gear member and cutter member crossed, rotating the members in mesh with the cutting edges of the cutter member engaging the roots of the teeth of the gear member to give the cutting edges of the cutting member a component of lateral motion relative to the roots of the teeth of the gear member, and effecting a relative movement between the members to give the cutting edges of the cutting member a second component of lateral motion relative to the roots of the teeth of the gear member, and the subsequent step of shaving portions of the flanks of the teeth of the gear member by meshing the gear member with a second circular gear-like cutter member having cutting edges provided on the flanks of the teeth thereof generally parallel to the plane of roll of the cutter member and with the axes of the gear member and the second cutter member crossed, rotating the gear member and the second cutter member in mesh to give the cutting edges of the second cutting member a component of lateral motion relative to the teeth of the gear member, and effecting a relative movement between the gear member and the second cutter member to give the cutting edges of the second cutter member a second component of lateral motion relative to the teeth of the gear member.

4. The method of finishing the teeth of a roughed-out gear which comprises meshing at crossed axes the gear with a gear-like cutter having cutting edges, rotating the gear and cutter while in mesh and with the cutting edges engaging the roots of the teeth of the gear to cut the same, during the rotation relatively translating the gear and cutter to thereby finish the roots and subsequently meshing at crossed axes the gear with a second gear-like cutter having cutting edges, rotating the gear and second cutter while in mesh and with the cutting edges of the second cutter engaging portions of the flanks of the gear, and during the rotation of the gear and second cutter relatively translating the same to thereby finish the flank portions.

DONALD D. AUSTIN.